3,341,504
METHOD FOR THE PREPARATION OF CHLORINE-CONTAINING POLYMERS OF DERIVATIVES OF 1,3-DIOXOLANONE-(2)
Franz Stürzenhofecker, Hermann Springmann, Wilhelm Dietrich, and Siegfried Artmeyer, Marl, Germany, assignors to Chemische Werke Huls Aktiengesellschaft, Marl, Germany, a corporation of Germany
No Drawing. Filed May 6, 1963, Ser. No. 278,426
Claims priority, application Germany, Sept. 6, 1962, C 27,868; Sept. 25, 1962, C 28,011
5 Claims. (Cl. 260—88.3)

It has been found that it is possible to prepare valuable chlorine-containing polymerization products of derivatives of 1,3-dioxolanone-(2), in which the dioxolane ring remains intact, by polymerizing 4,5-dichloro-4,5-bis-alkenyloxy-1,3-dioxolanones-(2) in known manner. Suitable monomers are for example 4,5-dichloro-4,5-bis-allyloxyethoxy-1,3-dioxolanone-(2),
4,5 - dichloro-4,5-bis-vinyloxyethoxy-1,3-dioxolanone-(2), and
4,5-dichloro-4,5-bis-allyloxy-1,3-dioxolanone-(2).

The polymerization can be accomplished without the presence of catalyzers by thermal treatment alone. Light, in some instances with the addition of a sensitizer, and especially ultraviolet light, Roentgen and gamma rays will accelerate the polymerization. The polymerization is accomplished usually in the presence of radical-forming catalyzers such as peroxide or azo catalyzers. Suitable peroxide catalyzers are for example hydrogen peroxide, potassium persulphate, perborates, percarbonates and organic percompounds such as dibenzoylperoxide, ditertiary butylperoxide, tertiary butylhydroperoxide, diacetylperoxide, diethylperoxycarbonate, cumenehydroperoxide and isopropylidenecarbanilicacidperamide. Suitable azo catalyzers are for example $\alpha,\alpha'$-azodiisobutyricacidnitrile, diazoaminobenzene, azo-bis-(diphenylmethane) and $\alpha,\alpha'$-azo-bis, $\gamma$-dimethylvaleronitrile. Furthermore, so-called Redox systems can be employed to initiate the polymerization, for example peroxides in combination with tertiary amines or cobalt-II-salts, possibly in combination with reducing agents such as dioxyacetone or reducing sugars, or the systems sacchrine/dimethylaniline and cerium-IV-salt/reducing agent. Catalyst mixtures can be used where the polymerization is initiated at lower temperatures and concluded at higher temperatures. The catalyzers are employed in amounts of .01 to 10, preferably .5 to 5 percent by weight relative to the monomer. It is advantageous to perform the polymerization in an atmosphere of inert gases such as nitrogen or carbon dioxide.

The polymerization can be carried out as a mass, precipitate, solution, suspension or emulsion polymerization.

If the polymerization is terminated when a 20% conversion of the monomer is reached, soluble polymerization products are obtained, but it is also possible to continue the polymerization until the monomers are converted completely. In the latter case insoluble and infusible shaped bodies, either with or without color, can be produced directly. Pigments, filling materials, stabilizers, extenders, elasticizers, foaming agents, flame inhibitors and other agents which will enhance the industrial usefulness of the polymerization products can be added. If it is intended to carry the polymerization only to an incomplete conversion, the process is terminated by the addition of known inhibitors such as hydroquinone or 4-tertiary-butylpyrocatechine, or by admission of air. The polymers are precipitated from the polymerization mass by use of precipitants. Most suitable for this purpose are aliphatic and alicyclic hydrocarbons such as petroleum ether, benzine and cyclohexane, and also lower aliphatic alcohols and ethers such as methanol, ethanol or diethylether. The precipitated pulverulent polymerization products are soluble in most of the organic solvents (with the exception of the precipitants listed above) such as benzene, acetone, methylethylketone, butylacetate, ethylacetate, styrene, butylacrylate, methylmethacrylate and dimethylformamide.

Solvents used in the solution polymerization are aromatic hydrocarbons, chlorohydrocarbons, ketones, esters and ethers such as benzene, toluene, xylene, dioxane, chloroform, acetone, butylacetate and butylpropionate. Surprisingly, soluble polymerization products are obtained in case of the solution polymerization even at high polymer yields. It is therefore possible in many instances to omit the addition of a controlling agent. However, it is also possible to employ such agents, for example carbon tetrachloride, dimeric $\alpha$-methylstyrene, trithiones, dodecylmercaptan and diisopropylxanthogendisulphide. The polymerization products can be precipitated by use of the above listed precipitants if so desired. However, it is also possible to employ the polymer solutions directly, especially for varnishes and paints.

The precipitation polymerization is carried out in organic solvents which dissolve the monomers only, for example aliphatic or alicyclic hydrocarbons such as benzine and cyclohexane. The polymerization products which precipitate soon after the beginning of the polymerization are separated by filtration.

The emulsion and suspension polymerizations are accomplished in known manner in water with the addition of emulsifying agents, suspension stabilizers and activating agents. Suitable emulsifying agents are for example the alkali metal salts of alkylsulphonates, aralkylsulphonates, higher fatty acids, substituted alkylsuccinic acids, the half esters of sulphuric acid, succinic acid and substituted succinic acids with long chain alcohols, the oxethylation products of alcohols and alkylphenols. Suitable as suspension stabilizers are for example polyvinylalcohol, gelatine, methylcellulose and inorganic salts such as barium sulphate.

During the polymerization care must be taken that the pH value of the polymerization mass does not fall within the alkaline range so as to prevent the hydrolytic splitting of the dioxolane ring.

By following the above described method, either soluble or insoluble and infusable polymerization products can be obtained which are favorably distinguished by their hardness and high surface gloss. The soluble polymerization products can be pressed with cross-linking at temperatures near the melting point of the polymer into shaped bodies which will be clear as glass.

The derivatives of the 4,5-dichloro-1,3-dioxolan-2-one which are suitable monomers for the above described method can be prepared in an easy manner and with excellent yields if tetrachloroethylenecarbonate is allowed to interact, in the absence of catalyzers under reduced pressure, with aliphatic or cycloaliphatic compounds containing hydroxyl groups. The tetrachloroethylenecarbonate, employed as the initial product, can be prepared in a simple manner and with excellent yield by chlorinating of ethylenecarbonate, monochloroethylenecarbonate, dichloroethylenecarbonate, or mixtures of these compounds. Suitable hydroxyl-group-containing compounds of the aliphatic series are primary monohydric saturated alcohols such as methanol, ethanol, propanol, butanol, and octanol, the length of the chain of the alcohols used being limited only by the intended use of the conversion product so obtained. Secondary and tertiary monohydric alcohols are usable in the process not at all or only with difficulty. The unsaturated primary alcohols of the olefine series such as allylalcohol and methallylalcohol can be utilized.

The term monohydric primary alcohols is understood to include also the monoethers of ethyleneglycol such as monoallylglycolether and monovinylglycolether. Cyclohexanol is particularly suitable as a hydroxyl group-containing compound of the cycloaliphatic series. The monohydric alcohols are allowed to react with tetrachloroethylenecarbonate at a molar ratio of 2:1, and 4,5-dichloro-1,3-dioxolane-2-ones substituted in 4- and 5-positions are obtained thereby. However, bivalent and polyvalent alcohols of the aliphatic series such as ethyleneglycol and polyethyleneglycols will react also. These alcohols are employed at a molar ratio of 1:1, and obtained are then higher molecular substitution products of the 4,5-dichloro-1,3-dioxolan-2-one which are preferably substituted in 4- and 5-positions.

The reaction is carried out usually at temperatures ranging from $-10°$ to $+100°$ C., preferably between $0°$ and $+10°$ C. Catalyzers are not required during the reaction. In case of very viscid or solid hydroxyl group-containing compounds solvents such as benzene can be employed so as to facilitate the homogenizing of the reaction mixture. However, as a rule, the reaction is carried out without the use of solvents. The reaction is carried out at reduced pressure, preferably between 10 and 20 torr, to facilitate removal of the generated hydrochloric acid. If necessary, mixing devices such as stirrers can be placed in the reaction vessel to facilitate the mixing operation.

Usually, the reaction is carried out by gradually adding the hydroxyl group-containing compounds to the tetrachloroethylenecarbonate initially placed in the vessel while care is taken that the selected temperature will not be exceeded substantially. The generated hydrochloric acid is removed from the reaction mixture by the simultaneously applied vacuum.

Upon conclusion of the admixture of the hydroxyl group-containing compound the temperature can be increased moderately.

The reaction mixture is purified by distilling, preferably under reduced pressure. The reaction product can also be dissolved in solvents such as benzene or diethylether, and the acid portions removed by the addition of alkaline agents such as soda. The filtered solution is then further processed by distillation.

In case of the described method the dioxolane ring will be split as expected in spite of the presence of hydrochloric acid. Therefore, substituted chlorinated dioxolan-2-ones are obtained through smooth and simple reaction. The method has the additional advantages that it can be carried out in the absence of catalyzers.

The compounds so obtained can be utilized either for the method described above or as reaction products with saturated hydroxyl group-containing substances, for example as softeners or flame inhibitors, or as intermediate products for further syntheses.

It is known to prepare 1,3-dioxolan-2-ones substituted in 4- and 5-positions by allowing epoxides with central oxirane ring, for example 2,3-epoxybutane, to react with carbon dioxide in the presence of catalyzers. However, there is only a limited selection of the substituent for the desired 1,3-dioxolan-2-one and furthermore it is very difficult to prepare suitable epoxide compounds. Also, a chlorination process for the preparation of the desired chlorinated products would be required resulting in a mixture of diversely chlorinated reaction products which can be separated only with difficulty. Also known is the preparation of alkyl-substituted 1,3-dioxolan-2-ones by the reaction of tertiary acetylenealcohols in the presence of copper salts with carbon dioxide; however, chlorinated products are not obtained by this process.

EXAMPLE 1

148 g. of butanol (2 mol) are added drop by drop within 2½ hours to 226 g. of tetrachloroethylenecarbonate (1 mol). The reaction temperature is 5 to 6° C. The generated hydrochloric acid is drawn off under vacuum (10 mm. Hg) during the reaction process. The reaction vessel is provided with a cooling finger charged with a Dry Ice-methanol mixture.

The raw product is subjected to the vacuum distillation; obtained are 275 g. of a transparent liquid, identified as 4,5-dibutoxy-4,5-dichloro-1,3-dioxolanone-2. Yield: 91% of the computed value.

Computed percent: C, 43.8; H, 6.0; O, 26.6; Cl, 23.6.
Found percent: C, 44.71; H, 6.35; O, 26.30; Cl, 23.3. $n_D^{20}$ 1.4438, $Kp_{.1}$ 102° C.

EXAMPLE 2

In the apparatus used for Example 1 and in the same manner 2 mol of allylalcohol are reacted with 1 mol of tetrachloroethylenecarbonate. Obtained, in the form of a transparent liquid are 225 g. (95% of the computed value) of 4,5-diallyloxy-4,5-dichloro-1,3-dioxolanone-2.

Computed percent: C, 40.1; H, 3.7; O, 29.8; Cl, 26.4.
Found percent: C, 40.53; H, 3.88; O, 29.50; Cl, 26.1. $n_D^{20}$ 1.4610, D 20/4 1.2770, $Kp_{.4}$ 95 to 96° C.

EXAMPLE 3

1 mol (130 g.) n-octanol are added drop by drop within 1½ hours to 113 g. (.5 mol) of tetrachloroethylenecarbonate at a temperature of 5° to 10° C. A vacuum of 12 mm. Hg is maintained during the addition of the octanol. After the addition the reaction is allowed to continue for three hours at a temperature of 25° C. while maintaining the vacuum. The raw product obtained thereby (207 g.) is dissolved in 200 ccm. of ether, 40 g. of sodium carbonate are added to the ethereal solution and the mixture is stirred for several hours at 25° C. After filtering the ether is drawn off. The product is 203 g. (98% of the computed value) of a colorless substance, its percentage of chlorine being identical with the computed value for the 4,5 - dioctyloxy - 4,5 - dichloro - 1,3-dioxolanone-2.

Computed percent: Cl, 17.18; molecular weight 413.
Found percent: Cl, 17.27; molecular weight 400. $n_D^{20}$ 1.4511.

EXAMPLE 4

25 g. of 4,5-dichloro-4,5-bis-allyloxy-1,3-dioxolanone-(2) are mixed with .25 g. of dibenzoylperoxide, and the solution is polymerized for 24 hours at a temperature of 70° C. under a nitrogen atmosphere. The polymerization product is obtained in the form of a shaped body which is clear as glass, hard, almost colorless and odorless. The product is infusible and insoluble in hydrocarbons, ketones, esters, chlorohydrocarbons and dimethylformamide. The IR-spectrum does not show any double bonds.

EXAMPLE 5

.25 g. of dibenzoylperoxide are dissolved in 25 g. of 4,5-dichloro-4,5-bis-allyloxy-1,3-dioxolanone-(2). The reaction vessel is washed out thoroughly with nitrogen and is closed off by a cover which is provided with a discharge device and a valve so as to create a vacuum. The polymerization is carried out for 17.5 hours at 180 torr and at a temperature of 70° C. A shaped body is obtained which is clear as glass with the odor of the monomer. The polymerization product is pulverized, washed five times with petroleum ether and dried, yielding 15.5 g. of poly-4,5-dichloro-4,5-bis-allyloxy-1,3-dioxolanone-(2). The polymerization product is insoluable and infusible.

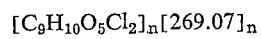

Computed (percent): C. 40.2; H, 3.7; O, 29.8; Cl, 26.3.
Found: C, 40.3; H, 3.7.

EXAMPLE 6

.2 ml. of a 25% diacetylperoxide solution in dimethylphthalate are added to 25 g. of 4,5 - dichloro - 4,5 - bis-allyloxy-1,3-dioxolanone-(2), and polymerized for 48 hours at a temperature of 70° C. in the manner described in Example 5. The product is obtained in the form of a shaped body which is clear as glass, hard, colorless and odorless.

EXAMPLE 7

.25 g. of azodiisobutyronitrile are added to 25 g. of 4,5-dichloro-4,5-bis-allyloxy-1,3-dioxolanone-(2), polymerized for 24 hours at a temperature of 60° C. and processed as described in Example 5. The product is 20 g. of a polymerization product which is yellowish and infusible.

EXAMPLE 8

A test identical with Example 6 is carried out but at a temperature of 80° C., yielding 23 g. of poly-4,5-dichloro-4,5-bis-allyloxy-1,3-dioxolanone-(2).

EXAMPLES 9 TO 11

Each time 15 g. of 4,5-dichloro-4,5-bis-allyloxy-1,3-dioxolanone-(2) and .15% of dibenzoylperoxide are polymerized at 70° C. as described in Example 4. After certain times listed in the table below the reaction is stopped by air and cooling in an ice bath and processed in the following manner:

*Example 9.*—The polymerization product is precipitated from the solution by a tenfold amount of petroleum ether. The specific viscosity of the polymerization product, measured in a 5% benzene solution, is .435 and its softening point is at 120° C. The product is easily soluble in dimethylformamide, acetone, butylacetate, styrene, methylmethacrylate and benzene.

*Example 10.*—50 ml. benzene is added to the preparation and 2.5 g. of undissolved matter is separated by centrifugal force. 1.0 g. of polymerization product is precipitated from the solution.

The undissolved polymerization product is infusible and is insoluble in dimethylformamide, acetone, butylacetate, benzene, 1,3-dioxolanone-(2) and 4,5-dichloro-4,5-bis-allyloxy-1,3-dioxolanone-(2).

*Example 11.*—The preparation is processed in the same manner as in Example 10. It contains no soluble polymerization products.

EXAMPLE 12

A reaction vessel, provided with reflux condenser, stirrer, thermometer and a pipe for introduction of nitrogen is charged with 300 g. of water, 100 g. of 4,5-dichloro-4,5-bis-allyloxy-1,3-dioxolanone-(2), 2 g. of alkylsulphonate and .66 g. of potassium persulphate. The mixture is heated to 60° C. and polymerized for 24 hours. After termination of the stirring action two phases form. From the aqueous phase 28.5 g. of an insoluble and infusible polymerization product is obtained by the precipitation with a NaCl-solution.

The organic phase is diluted with benzene and precipitated with petroleum ether. An additonal 5.5 g. of polymerization product is obtained which melts at 70° to 80° C. and is soluble in benzene.

EXAMPLE 13

If a test is conducted in accordance with Example 12 but by use of 1.32 g. potassium persulphate and at a temperature of 50° C., the aqueous phase will yield 16 g. of an insoluble polymerization product and the organic phase 4 g. of a soluble polymerization product.

EXAMPLES 14 TO 17

50 g. of 4,5-dichloro-4,5-bis-diallyloxy-1,3-dioxolanone-(2) and .75 g. of dibenzoylperoxide are dissolved in 150 ml. of cyclohexane. The reaction vessel is first washed with nitrogen and then heated, and the polymerizations are performed during the time periods and at the temperatures listed in Table 2. The polymerization products precipitate during the polymerization. They are insoluble in organic solvents and infusible.

TABLE 2

| Ex. | Polymerization temperature, ° C. | Polymerization time in hours | Yield (g.) |
| --- | --- | --- | --- |
| 14 | 70 | 4 | 4.8 |
| 15 | 70 | 8 | 11.3 |
| 16 | 70 | 24 | 24.0 |
| 17 | 80 | 24 | 40.0 |

EXAMPLES 18 TO 23

50 g. of 4,5-dichloro-4,5-bis-allyloxy-1,3-dioxolanone-(2) and dibenzoylperoxide in the amounts given in Table 3 are dissolved in 150 ml. of solvent. The reaction vessel is first washed with $N_2$ and then heated, and the polymerizations are performed within the time periods and at the temperatures listed in Table 3. The viscosities of the solutions increase.

TABLE 3

| Ex. | Solvent | Dibenzoylperoxide (g.) | Temperature, ° C. | Time, Hours | Yield (g.) | Specific viscosity in 5% benzene solution |
| --- | --- | --- | --- | --- | --- | --- |
| 18 | Benzene | .75 | 70 | 24 | 12 | |
| 19 | do | 2.50 | 70 | 24 | 24 | |
| 20 | Dioxane | .75 | 70 | 24 | 11 | .152 |
| 21 | do | 2.50 | 70 | 24 | 17 | .275 |
| 22 | do | 2.50 | 80 | 24 | 27 | .282 |
| 23 | Butylacetate | 2.50 | 80 | 24 | 37 | |

TABLE 1

| Example | Time of reaction | Consistency of preparation | Polymerization Product | |
| --- | --- | --- | --- | --- |
| | | | Yield (g.) | Characteristics |
| 9 | 1 hour 50 min | Viscous solution | 3.0 | Soluble in benzene, insoluble in petroleum ether. |
| 10 | 2 hours | Gelatinous | 3.5 | Partly soluble, partly insoluble. |
| 11 | 3.5 hours | Solid, not hard | 8.5 | Insoluble. |

The polymerization products are precipitated with a tenfold amount of methanol or petroleum ether, and washed with petroleum ether. All products are easily soluble in aromatic hydrocarbons, esters, dioxane and acetone and will melt at temperatures between 120° and 170° C. From these polymerization products infusible and insoluble pressed plates can be manufactured at temperatures near the melting point.

EXAMPLES 24 TO 27

150 ml. of the below named solvents are added to 50 g. of 4,5-dichloro-4,5-bis-allyloxy-1,3-dioxolanone-(2), 5 ml.

of a 25% diacetylperoxide solution in dimethylphthalate and 20 ml. of carbon tetrachloride. The reaction vessel is first washed with nitrogen and then heated, and the polymerizations are performed at a temperature of 70° C. within time periods as indicated in Table 4. The polymerization products are processed in the same manner as in Examples 18 to 23.

TABLE 4

| Ex. | Solvent | Time (hours) | Yield (g.) |
|---|---|---|---|
| 24 | Butylacetate | 5.5 | 38.5 |
| 25 | ___do___ | 8 | 44 |
| 26 | Benzene | 5.5 | 31 |
| 27 | Dioxane | 5.5 | 19 |

We claim:
1. 4,5-dichloro-4,5-bis-allyloxy-1,3-dioxolanone-(2).
2. Polymeric 4,5 - dichloro - 4,5-bis-allyloxy-1,3-dioxolanone-(2).
3. The method of preparing a new synthetic composition which comprises polymerizing 4,5-dichloro-4,5-bis-allyloxy-1,3-dioxolanone-(2) under heat to a conversion of the monomer up to 20% at a pH-value outside of the alkaline range.
4. The method as in claim 3 which comprises polymerizing in presence of a free radical type catalyst.
5. The method of preparing a new synthetic composition which comprises polymerizing 4,5-dichloro-4,5-bis-allyloxy-1,3-dioxolanone-(2) in a solution in a solvent selected from the group consisting of aromatic hydrocarbons, chlorohydrocarbons, ketones, esters and ethers at a pH-value outside of the alkaline range in presence of a free radical type catalyst.

References Cited

UNITED STATES PATENTS 2,522,680  9/1950  Kropa et al. _____ 260—88.3
3,021,340  2/1962  Anderson _____ 260—88.3

JOSEPH L. SCHOFER, *Primary Examiner.*

JAMES A. SEIDLECK, *Examiner.*

H. WONG, *Assistant Examiner.*